United States Patent
Balakrishnan et al.

(10) Patent No.: US 9,471,361 B2
(45) Date of Patent: Oct. 18, 2016

(54) VIRTUAL MACHINE (VM) SEQUENCER AND SCHEDULER TO AVOID BOOT STORM

(71) Applicant: AMERICAN MEGATRENDS, INC., Norcross, GA (US)

(72) Inventors: Venkatesan Balakrishnan, Chennai (IN); Veerajothi Ramasamy, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 292 days.

(21) Appl. No.: 14/293,608

(22) Filed: Jun. 2, 2014

(65) Prior Publication Data
US 2015/0347172 A1  Dec. 3, 2015

(51) Int. Cl.
*G06F 9/455* (2006.01)
*G06F 9/44* (2006.01)
*G06F 9/48* (2006.01)

(52) U.S. Cl.
CPC ......... *G06F 9/45558* (2013.01); *G06F 9/4416* (2013.01); *G06F 9/4881* (2013.01); *G06F 2009/45575* (2013.01)

(58) Field of Classification Search
None
See application file for complete search history.

(56) References Cited

U.S. PATENT DOCUMENTS

2012/0005673 A1\* 1/2012 Cervantes ........... G06F 9/45558
718/1
2014/0181814 A1\* 6/2014 Lee ..................... G06F 9/45558
718/1

OTHER PUBLICATIONS

Parker, Aaron, "Sequential Staring of a List of VMs" Feb. 27, 2014.\*

\* cited by examiner

*Primary Examiner* — Qing Wu
(74) *Attorney, Agent, or Firm* — Locke Lord LLP; Tim Tingkang Xia, Esq.

(57) ABSTRACT

In one aspect, a system includes at least one virtualization server configured to executed a hypervisor, and a storage server in communication to the at least one virtualization server. The storage server stores a plurality of virtual machine (VM) operating systems (OS's). The storage server comprises computer executable code, including a VM scheduler service (VMSS) module. The VMSS module is configured to determine a scheduled start time for each of the VM OS's based on configuration data corresponding to the VM OS's, generate a command based on the scheduled start time for each of the VM OS's, and send the command to the at least one virtualization server. Upon receiving the command, the hypervisor executed at the at least one virtualization server requests data of one of the VM OS's at the corresponding scheduled start time to start the one of the VM OS's.

24 Claims, 5 Drawing Sheets

VIRTUAL MACHINE (VM) SEQUENCER AND SCHEDULER TO AVOID BOOT STORM

FIELD

The present disclosure relates to computer technology, and particularly to a system and method of controlling the sequence and schedules of the booting of virtual machines (VM) to avoid boot storm.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "boot storm" refers to a storage device being shared by multiple virtual machines (VM's) and all VM's are started (or booted) at roughly the same time. This is a typical problem in the server computer of a centralized client-server system, which may have multiple thin clients. For example, a company may start its office hour at 9 a.m. The employees who work in the office of company may all start work around 9 a.m., and as a result, they all turn on their computers (i.e. thin client terminals) around 9 a.m. Each computer terminal in the booting process will start a VM at the centralized server, and the booting process does heavy disk input/output (I/O). When multiple VM's start together around the same time, the disk I/O at the server goes beyond the sustainable level and causes the boot storm. The boot storm affects the startup time of the VM's. The startup time grows exponentially against the number of VM's started at the same time.

Currently, there are different ways to handle the boot storm problem. For example, the server may use high speed solid state drives (SSD) as the storage device to increase the disk I/O speed. In some cases, the server may use RAM disk drivers or other memory disk drivers to implement memory-emulated disk to increase the disk I/O speed. However, these methods generally induce high hardware or software costs, and may be power consuming.

Therefore, an unaddressed need exists in the art to address the aforementioned deficiencies and inadequacies.

SUMMARY

Certain aspects of the present disclosure direct to a system, which includes: at least one virtualization server configured to execute a hypervisor; and a storage server in communication to the at least one virtualization server. The storage server stores a plurality of virtual machine (VM) operating systems (OS's), and includes computer executable code. The code, when executed at a processor, is configured to determine a scheduled start time for each of the VM OS's based on configuration data corresponding to the VM OS's, generate a command based on the scheduled start time for each of the VM OS's, and send the command to the at least one virtualization server such that the hypervisor at the at least one virtualization server requests data of one of the VM OS's at the corresponding scheduled start time to start the one of the VM OS's.

In certain embodiments, the code includes a VM scheduler service (VMSS) module and a configuration module storing the configuration data corresponding to the VM OS's, where the VMSS module is configured to retrieve the configuration data from the configuration module, determine the scheduled start time for each of the VM OS's based on the configuration data, generate the command based on the scheduled start time for each of the VM OS's, and send the command to the at least one virtualization server.

In certain embodiments, the configuration data includes data of the scheduled start time for each of the VM OS's.

In certain embodiments, the configuration data includes data usable to calculate the scheduled start time for each of the VM OS's. In certain embodiments, the data usable to calculate the scheduled start time for each of the VM OS's includes data of a total number of the VM OS's, an order of each VM OS in a sequence of the VM OS's, a starting time length for each of the VM OS's, and a number of the VM OS's to be simultaneously started. In certain embodiments, the VMSS module is configured to determine the scheduled start time for each of the VM OS's by calculating the scheduled start time based on the total number of the VM OS's, the order of each VM OS in the sequence of the VM OS's, the starting time length for each of the VM OS's and the number of the VM OS's to be simultaneously started.

In certain embodiments, the system further includes at least one remote computing device in communication to the at least one virtualization server via a network.

In certain embodiments, the hypervisor is configured to receive the command from the storage server, determine the scheduled start time for the one of the VM OS's based on the command, at the scheduled start time for the one of the VM OS's, request data of the one of the VM OS's from the storage server, and in response to receiving an executing command of a specific one of the VM OS's from the at least one remote computing device via the network, execute the specific one of the VM OS's.

In certain embodiments, the hypervisor is configured to request data of at least two of the VM OS's from the storage server simultaneously.

In certain embodiments, when the hypervisor receives, from the at least one remote computing device via the network, the executing command of the specific one of the VM OS's prior to the scheduled start time for the specific one of the VM OS's, the hypervisor is further configured to: based on the executing command, request data of the specific one of the VM OS's from the storage server, and execute the specific one of the VM OS's without waiting until the scheduled start time.

Certain aspects of the present disclosure direct to a method of controlling sequence and schedules of booting of a plurality of VM's, which includes: determining, at a storage server, a scheduled start time for each of a plurality of VM operating systems (OS's) based on configuration data corresponding to the VM OS's; generating, at the storage server, a command based on the scheduled start time for each of the VM OS's; and sending, by the storage server, the command to at least one virtualization server such that a hypervisor executed at the at least one virtualization server requests data of one of the VM OS's at the corresponding scheduled start time to start the one of the VM OS's.

In certain embodiments, the storage server includes a VM scheduler service (VMSS) module and a configuration module storing the configuration data corresponding to the VM OS's, where the VMSS module is configured to retrieve the configuration data from the configuration module, determine the scheduled start time for each of the VM OS's based on the configuration data, generate the command based on the scheduled start time for each of the VM OS's, and send the command to the at least one virtualization server.

In certain embodiments, the configuration data includes data of the scheduled start time for each of the VM OS's.

In certain embodiments, the configuration data includes data usable to calculate the scheduled start time for each of the VM OS's.

In certain embodiments, the data usable to calculate the scheduled start time for each of the VM OS's includes data of a total number of the VM OS's, an order of each VM OS in a sequence of the VM OS's, a starting time length for each of the VM OS's, and a number of the VM OS's to be simultaneously started.

In certain embodiments, the VMSS module is configured to determine the scheduled start time for each of the VM OS's by calculating the scheduled start time based on the total number of the VM OS's, the order of each VM OS in the sequence of the VM OS's, the starting time length for each of the VM OS's and the number of the VM OS's to be simultaneously started.

In certain embodiments, the method further includes: receiving, at the hypervisor executed at the at least one virtualization server, the command from the storage server; determining, at the hypervisor, the scheduled start time for the one of the VM OS's based on the command; at the scheduled start time for the one of the VM OS's, requesting, by the hypervisor, data of the one of the VM OS's from the storage server; in response to receiving an executing command of a specific one of the VM OS's from at least one remote computing device via a network, executing, at the hypervisor, the specific one of the VM OS's; and in response to receiving, at the hypervisor from the at least one remote computing device via the network, the executing command of the specific one of the VM OS's prior to the scheduled start time for the specific one of the VM OS's, requesting, by the hypervisor, data of the specific one of the VM OS's from the storage server based on the executing command, and executing the specific one of the VM OS's without waiting until the scheduled start time.

In certain embodiments, the hypervisor is configured to request data of at least two of the VM OS's from the storage server simultaneously.

Certain embodiments of the present disclosure direct to a non-transitory computer readable medium storing computer executable code. The code, when executed at a processor, is configured to determine, at a storage server, a scheduled start time for each of a plurality of virtual machine (VM) operating systems (OS's) based on configuration data corresponding to the VM OS's, generate, at the storage server, a command based on the scheduled start time for each of the VM OS's, and send, by the storage server, the command to at least one virtualization server such that a hypervisor executed at the at least one virtualization server requests data of one of the VM OS's at the corresponding scheduled start time to start the one of the VM OS's.

In certain embodiments, the code includes a VM scheduler service (VMSS) module and a configuration module storing the configuration data corresponding to the VM OS's, wherein the VMSS module is configured to retrieve the configuration data from the configuration module, determine the scheduled start time for each of the VM OS's based on the configuration data, generate the command based on the scheduled start time for each of the VM OS's, and send the command to the at least one virtualization server.

In certain embodiments, the configuration data includes data of the scheduled start time for each of the VM OS's.

In certain embodiments, the configuration data includes data usable to calculate the scheduled start time for each of the VM OS's.

In certain embodiments, the data usable to calculate the scheduled start time for each of the VM OS's includes data of a total number of the VM OS's, an order of each VM OS in a sequence of the VM OS's, a starting time length for each of the VM OS's, and a number of the VM OS's to be simultaneously started.

In certain embodiments, the VMSS module is configured to determine the scheduled start time for each of the VM OS's by calculating the scheduled start time based on the total number of the VM OS's, the order of each VM OS in the sequence of the VM OS's, the starting time length for each of the VM OS's and the number of the VM OS's to be simultaneously started.

In certain embodiments, the hypervisor executed at the at least one virtualization server is configured to receive the command from the storage server, determine the scheduled start time for the one of the VM OS's based on the command, at the scheduled start time for the one of the VM OS's, request data of the one of the VM OS's from the storage server, in response to receiving an executing command of a specific one of the VM OS's from the at least one remote computing device via the network, execute the specific one of the VM OS's, and in response to receiving, from the at least one remote computing device via the network, the executing command of the specific one of the VM OS's prior to the scheduled start time for the specific one of the VM OS's, request data of the specific one of the VM OS's from the storage server based on the executing command, and execute the specific one of the VM OS's without waiting until the scheduled start time.

In certain embodiments, the hypervisor is configured to request data of at least two of the VM OS's from the storage server simultaneously.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
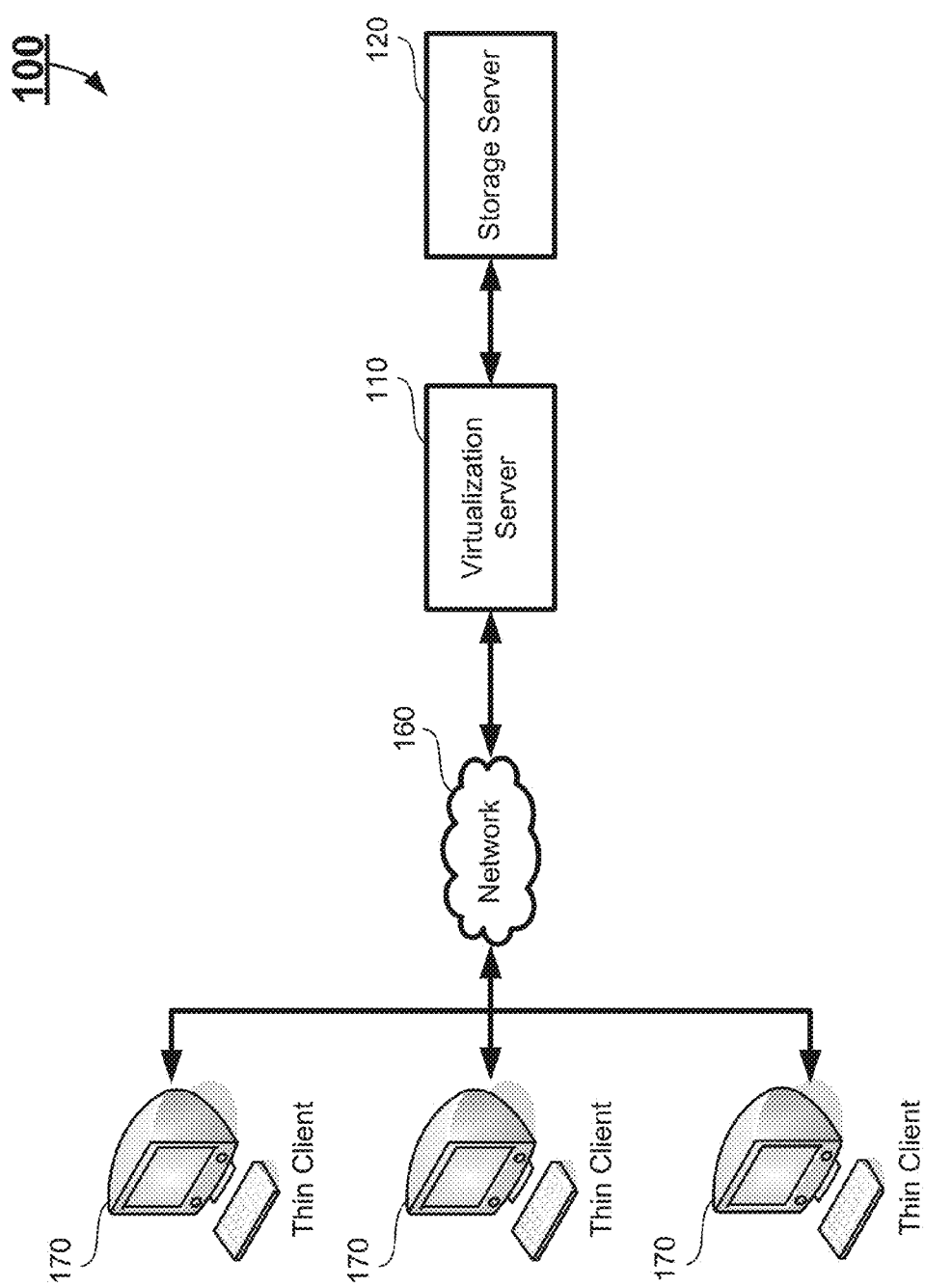
FIG. 1 schematically depicts a centralized computer system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code," as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors of various architectures. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The present disclosure is directed to a centralized computer system, which includes a virtualization server, a storage server and a plurality of thin client computers. The virtualization server runs VM instances. The storage server has a VM scheduler service (VMSS) module, which is configured to schedule the booting of the VM's based on a predetermined startup time of the VM's and the configuration setting of the VM's.

FIG. 1 schematically depicts a centralized system according to certain embodiments of the present disclosure. As shown in FIG. 1, the system 100 includes at least one virtualization server 110 and at least one storage server 120. A plurality of thin client computers 170 is connected to the virtualization server 110 via a network 160. The system 100 adopts the virtual desktop infrastructure, and can be a system that incorporates more than one interconnected system, such as a client-server network. The network 160 may be a wired or wireless network, and may be of various forms such as a local area network (LAN) or wide area network (WAN) including the Internet. In certain embodiments, the virtualization server 110 is connected to the storage server 120 through a communication link such that the virtualization server 110 may share the files stored in the storage server 120. In certain embodiments, the communication link can be a file sharing link, such as a server message block (SMB) interface link, or any other communication link that allows file sharing between the virtualization server 110 and the storage server 120.

The virtualization server 110 is a computing device serving as a host server for the system, providing a hypervisor for running multiple VM instances. In certain embodiments, the virtualization server 110 may be a general purpose computer server system or a headless server.

Figure 2A:
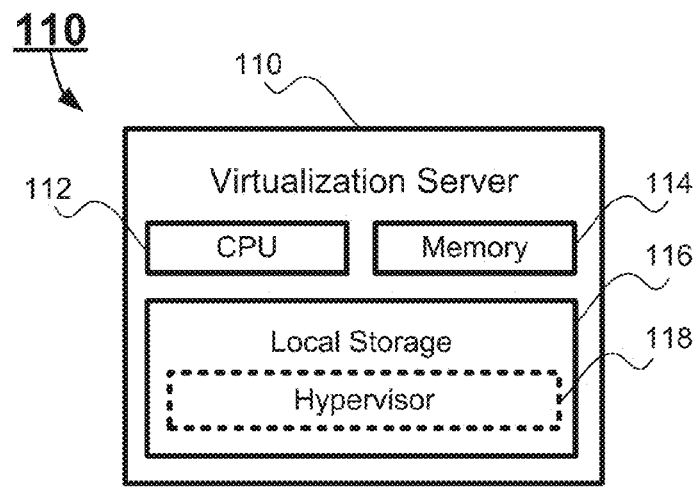
FIG. 2A schematically depicts a virtualization server and a storage server of the system according to certain embodiments of the present disclosure.

FIG. 2A schematically depicts a virtualization server of the system according to certain embodiments of the present disclosure. As shown in FIG. 2A, the virtualization server 110 includes a central processing unit (CPU) 112, a memory 114, and other required memory, interfaces and Input/Output (I/O) modules (not shown). Optionally, the virtualization server 110 may include a local storage 116. A hypervisor 118 is stored in the local storage 116.

The CPU 112 is a host processor which is configured to control operation of the virtualization server 110. The CPU 112 can execute the hypervisor 118 or other applications of the virtualization server 110. In certain embodiments, the virtualization server 110 may run on more than one CPU as the host processor, such as two CPUs, four CPUs, eight CPUs, or any suitable number of CPUs.

The memory 114 can be a volatile memory, such as the random-access memory (RAM), for storing the data and information during the operation of the virtualization server 110.

The local storage 116 is a non-volatile data storage media for storing the hypervisor 118 and other applications of the host computer 110. Examples of the storage 116 may include flash memory, memory cards, USB drives, hard drives, floppy disks, optical drives, or any other types of data storage devices.

The hypervisor 118 is a program that allows multiple VM instances to run simultaneously and share a single hardware host, such as the virtualization server 110. The hypervisor 118, when executed at the CPU 112, implements hardware virtualization techniques and allows one or more operating systems or other applications to run concurrently as guests of one or more virtual machines on the host server (i.e. the virtualization server 110). For example, a plurality of users, each from one of the thin clients 170, may attempt to run operating systems (OS's) in the system 100. The hypervisor 118 allows each user to run an OS instance as a VM OS. In certain embodiments, the hypervisor 118 can be of various types and designs, such as MICROSOFT HYPER-V, XEN, VMWARE ESX, or other types of hypervisors suitable for the system 100.

Figure 2B:
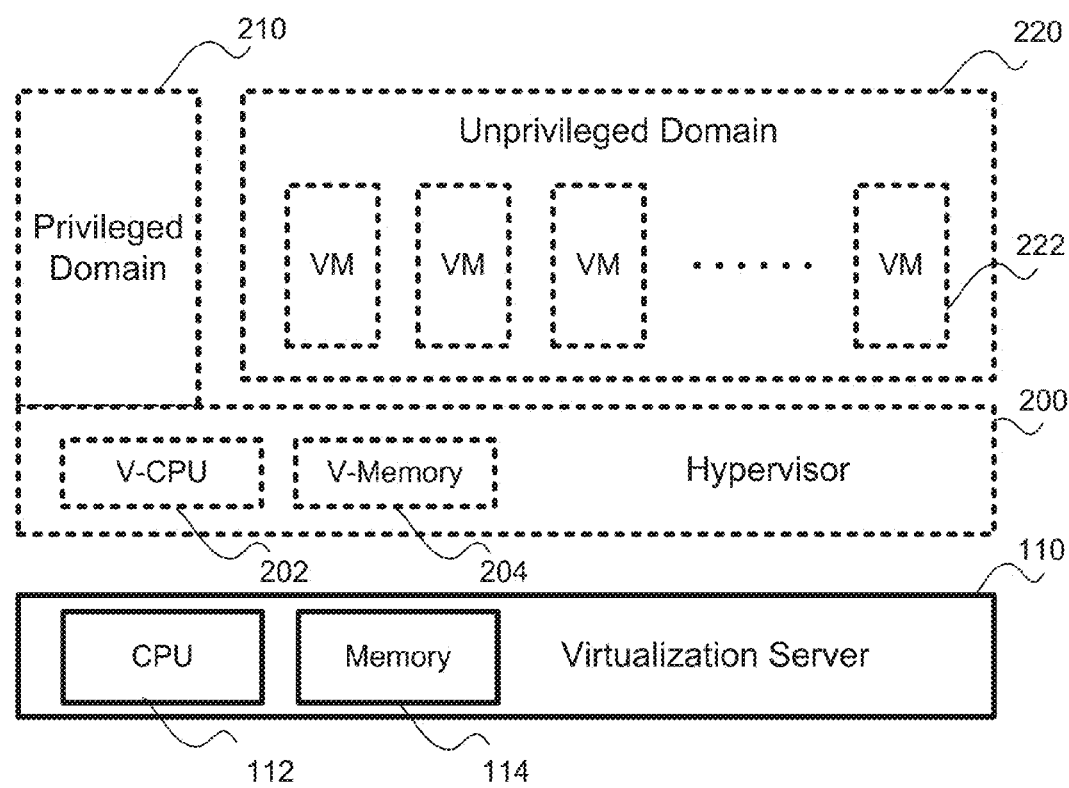
FIG. 2B schematically depicts the execution of the VM's on the system according to certain embodiments of the present disclosure.

FIG. 2B schematically depicts the execution of the VM's on the system according to certain embodiments of the present disclosure. As shown in FIG. 2B, when the hypervisor instance 200 runs on the hypervisor server 110, the hypervisor 200 emulates a virtual computer machine, including a virtual CPU 202 and a virtual memory 204. The hypervisor 200 also emulates a plurality of domains, including a privileged domain 210 and an unprivileged domain 220 for the VM. A plurality of VM's 222 can run in the unprivileged domain 220 of the hypervisor 200 as if they are running directly on a physical computer. Each VM 222 corresponds to a thin client 170. In certain embodiments, the virtual memory 204 may correspond to a part of the memory 114. In other words, data or information stored in the virtual memory 204 is physically stored in the physical memory 114 of the virtualization server 110.

Each of the thin clients 170 is a remote computing device whose operation depends heavily on the servers of the system 100. In certain embodiments, a user may operate from one of the thin clients 170 to remotely connect to the virtualization server 110, and operates a VM OS on a hypervisor 200 of the virtualization server 110. For example, the user may connect to the virtualization server 110 from the thin client 170, and launch a VM OS on the hypervisor 200. In certain embodiments, each of the thin clients 170 can be a computing device, such as a general purpose computer, a laptop computer, a mobile device, or any other computer devices or systems.

The storage server 120 is a computing device providing storage functionality of the system 100. In other words, the system 100 stores all data in the storage server 120, including data of the VM OS's, user data, configuration data of the VM OS's and other applications of the storage server 120. In certain embodiments, the hypervisor 118 of the virtualization server 110 may also be stored in the storage server 120. In certain embodiments, when the storage server 120 is offline, the system 100 may notify the virtualization server 110 to stop the virtualization service until the storage server 120 is back to operation. In certain embodiments, the storage server 120 may be a general purpose computer server system or a headless server. In certain embodiments, the storage server 120 and the virtualization server 110 may be implemented together by one single physical server or computing device.

Figure 3:
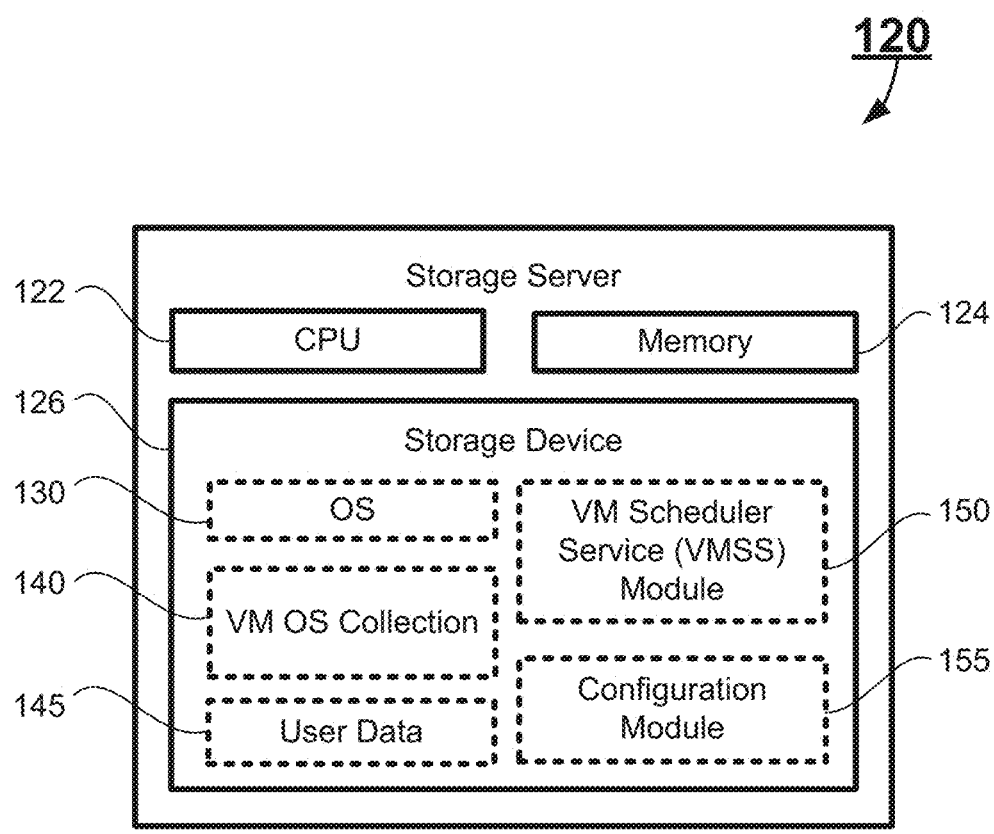
FIG. 3 schematically depicts a storage server according to certain embodiments of the present disclosure.

FIG. 3 schematically depicts a storage server according to certain embodiments of the present disclosure. As shown in FIG. 3, the storage server 120 includes a CPU 122, a memory 124, a storage device 126, and other required memory, interfaces and I/O modules (not shown). The storage device 126 stores an OS 130, a VM OS collection 140, user data 145, a VM scheduler server (VMSS) module 150, and a configuration module 155.

The CPU 122 is a host processor which is configured to control operation of the storage server 120. The CPU 122 can execute the OS 130, the VMSS module 150 or other applications of the storage server 120. In certain embodiments, the storage server 120 may run on more than one CPU as the host processor, such as two CPUs, four CPUs, eight CPUs, or any suitable number of CPUs.

The memory 124 can be a volatile memory, such as the random-access memory (RAM), for storing the data and information during the operation of the storage server 120. In certain embodiments, when the storage server 120 is in operation, the data and information stored in the memory 124 may include a file system, the OS 130, the VMSS module 150, and other data or information necessary for the operation of the storage server 120.

The storage device 126 is a non-volatile data storage media for storing the OS 130, the VM OS collection 140, the user data 145, the VMSS module 150, the configuration module 155, and other applications of the storage server 120. Examples of the storage 116 may include flash memory, memory cards, USB drives, hard drives, floppy disks, optical drives, or any other types of data storage devices.

The OS 130 can be collective management software managing the operation of the storage server 120. For example, the OS 130 can include a set of functional programs that control and manage operations of the devices connected to the storage server 120. The set of application programs provide certain utility software for the user to manage the storage server 120. In certain embodiments, the OS 130 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

The VM OS collection 140 includes data collection of a plurality of VM OS's. Each VM OS is an OS, which can be run on a VM 222 for one user as shown in FIG. 2B. In certain embodiments, each VM OS stored in the VM OS collection 140 corresponds to one or more users of the system 100. In certain embodiments, the VM OS collection 140 may be divided into a plurality of pools or groups of VM OS's, and each pool or group of the VM OS's can be stored in a separated storage device. In this case, data of the VM OS's in different pools or groups may be independent and simultaneously retrievable, and the VMSS module 150 may simultaneously start multiple VM OS instances from different pools or groups.

The user data 145 includes user profiles of all users of the system 100. Each user of the system 100 has a user profile, indicating the login identification and password of the user from the thin client 170, the designated VM OS used by the user, and other necessary user information.

The VMSS module 150 controls the schedule and sequence of the booting of the VM OS's based on configuration data, which is stored in the configuration module 155. The configuration module 155 stores the configuration data, which indicates the schedule and sequence of the booting of the VM OS's. In certain embodiments, the VMSS module 150 and the configuration module 155 can be implemented in the form of a microcontroller or a chip, which is separated from the storage device 126.

Figure 4:
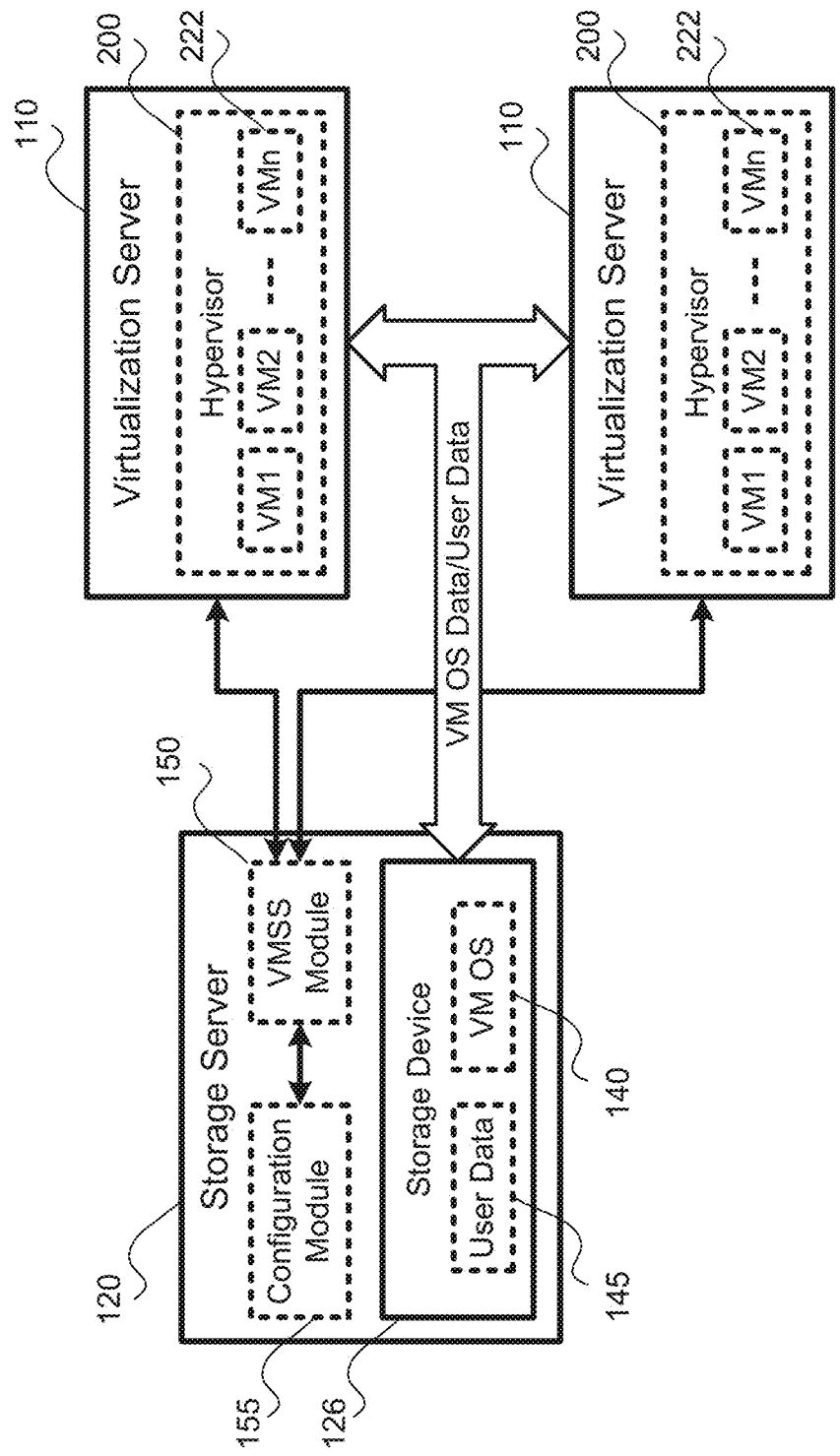
FIG. 4 schematically depicts data flow between the storage server and two virtualization servers according to certain embodiments of the present disclosure.

In certain embodiments, the system 100 may include one or more virtualization servers 110. FIG. 4 schematically depicts data flow between the storage server and two virtualization servers according to certain embodiments of the present disclosure. As shown in FIG. 4, each of the virtualization server 110 runs a hypervisor 200, and a plurality of VM's 222 can run on the hypervisor 200. The storage server 120 runs the VMSS module 150. The VMSS module 150 retrieves the configuration data from the configuration module 155 to obtain the data of scheduled time for uploading the data of each VM OS to the hypervisor 200 at the virtualization server 110. Based on the configuration data, the VMSS module 150 generates corresponding commands indicating the scheduled time for each VM OS for the virtualization servers 110, and sends the commands to each of the virtualization servers 110. In certain embodiments, each command may correspond to the scheduled time for one or more VM OS's. At the virtualization server 110, the hypervisor 200 receives the commands. Based on the commands, the hypervisor 200 waits until the scheduled time to request the necessary data of the designated VM OS for booting, and stores the data of the designated VM OS in the corresponding VM 222. For example, the VM's 222 in each virtualization server 110 may be in a sequence of VM1, VM2, . . . , VMn based on the scheduled time for each VM OS, and at each of the scheduled time slot for each VM 222, the hypervisor 200 requests from the storage server for retrieving the data of the corresponding VM OS to be booted on the VM 222. Thus, the data of the VM OS is ready in the memory 114 of the virtualization server 110 for the user. When the user attempts to login the system 100 at the thin client 170, the virtualization server 110 does not need to retrieve the data of the VM OS from the storage server 120, thus reducing the disk I/O at the storage server 120.

In certain embodiments, the configuration data stored in the configuration module 155 includes data of scheduled start time for uploading the data of each VM OS to the hypervisor 200 at the virtualization server 110. In certain embodiments, the scheduled start time for each VM OS can be determined based on a plurality of factors of the VM OS stored in the storage server 120. For example, the scheduled time for each VM OS can be calculated by the total number of the VM OS's, the order of each VM OS in the sequence, the starting time length for each VM OS, and the number of VM OS's that can be simultaneously started. For example, a company which has 100 employees may start its office hour at 9 a.m. In this case, the system 100 has 100 thin clients 170. Suppose that for each thin client 170, the start time of a VM OS at the virtualization server 110 is 15 seconds, the total start time for all users of the system 100 is 15*100=1500 seconds, or 25 minutes. Thus, if the VMSS module 150 cannot simultaneously start multiple VM OS instances (i.e. only one VM OS instance can be started at a time), the scheduled start time for the first VM OS is at 8:35 a.m., which is 25 minutes before the actual start time of the office hour. In this way, four VM OS instances can be started in one minute, and the scheduled start time for each of the VM OS's can be calculated. For example, the scheduled start time for the fifth VM OS is at 8:36 a.m., which is exactly one minute after the scheduled start time for the first VM OS.

In certain embodiments, if the VMSS module 150 can simultaneously start two VM OS instances, the start time of two simultaneously starting VM OS's can be less than 30 (=15*2) seconds, and the total start time for all users of the system 100 can be thus decreased. If the VMSS module 150 can simultaneously start more than two VM OS instances, the total start time of the system can be further decreased. Since the VMSS module 150 starts the VM OS instances earlier than the crowd of the employees coming to the office, the disk I/O at the storage server 120 can be greatly reduced to avoid the boot storm problem.

In certain embodiments, some of the users or employees may occasionally come to the office early before the virtualization server 110 retrieves the VM OS at the scheduled time. In this case, the virtualization server 110 may start the VM OS for the user immediately without waiting until the scheduled time. If the virtualization server 110 is in the process of performing the scheduled starting of other VM OS instances, the virtualization server 110 may stop the scheduled starting process, start the VM OS for the user, and then continue with the scheduled starting process.

In certain embodiments, the configuration data stored in the configuration module 155 does not include data of scheduled time for uploading the data of each VM OS to the virtualization server 110. Instead, the configuration data includes data that can be used to calculate the scheduled time. For example, the configuration data may include data corresponding to the VM OS stored in the storage server 120, such as the total number of the VM OS's, the order of each VM OS in the sequence, the data of the starting time length for each VM OS and the number of VM OS's that can be simultaneously started. Once obtaining the configuration data, the VMSS module 150 can then calculate the scheduled time for each VM OS based on the configuration data.

In certain embodiments, the system 100 may include one or more storage servers 120, and each of the storage servers 120 may have its own VM OS collection 140, VMSS module 150 and configuration module 155. For each of the storage servers 120, the configuration data stored in the configuration module 155 may be determined by the factors of the VM OS stored in the storage server 120, and may be independent from one another.

Figure 5:
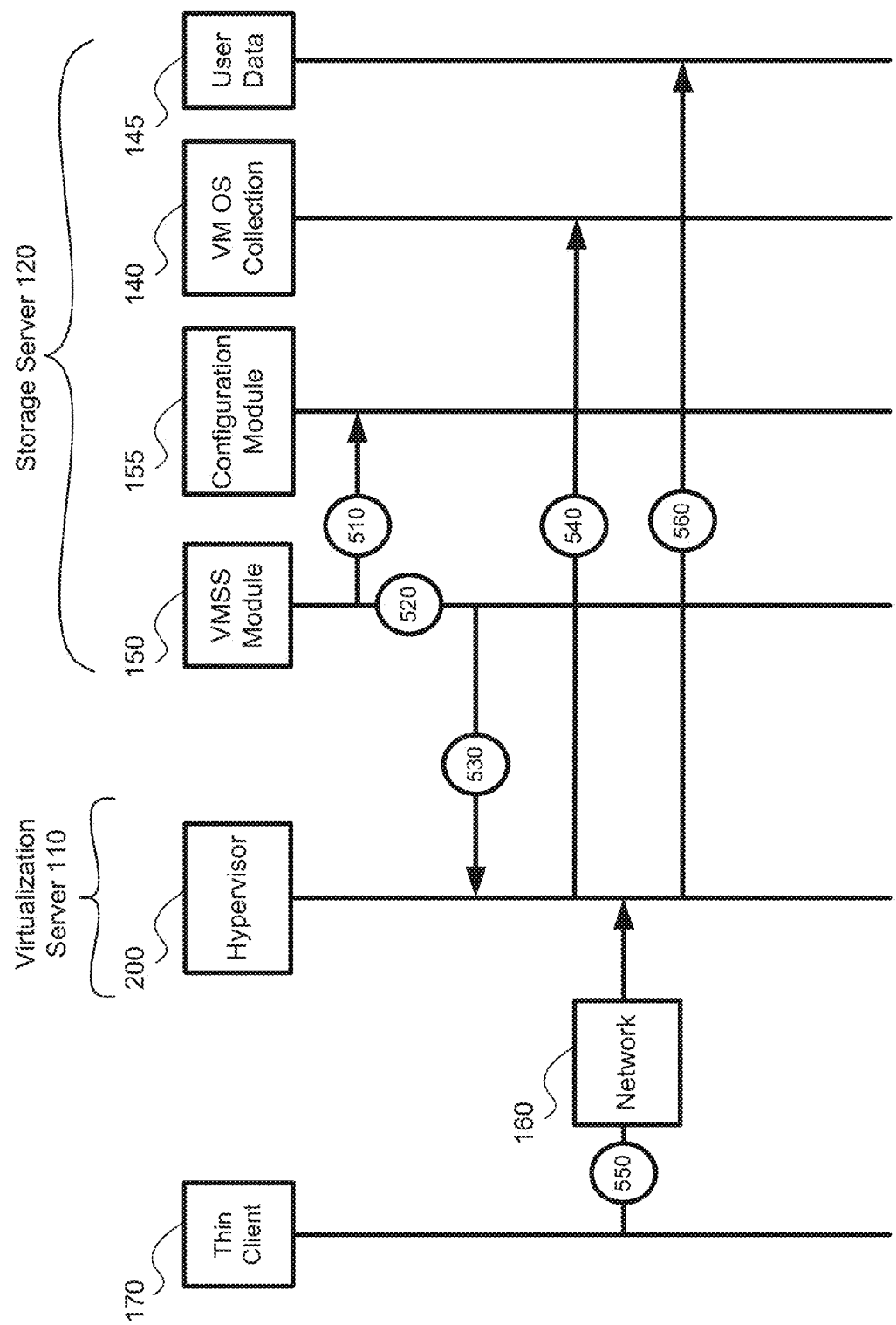
FIG. 5 schematically depicts a sequential process of the booting of the centralized computer system according to certain embodiments of the present disclosure.

FIG. 5 schematically depicts a sequential process of the booting of the centralized computer system according to certain embodiments of the present disclosure. In this embodiment, only one virtualization server 110 and one storage server 120 is provided.

At procedure 510, the VMSS module 150, which is running at the storage server 120, retrieves the configuration data from the configuration module 155. As discussed above, the configuration data may include the data of scheduled time for uploading the data of each VM OS to the hypervisor 200 at the virtualization server 110, or may include data that can be used to calculate the scheduled time. At procedure 520, based on the configuration data, the VMSS module 150 generates corresponding commands indicating the scheduled time for each VM OS for the virtualization servers 110.

At procedure 520, the VMSS module 150 sends the commands to each of the virtualization servers 110. In certain embodiments, each command may correspond to the scheduled time for one or more VM OS's.

At the virtualization server 110, the hypervisor 200 receives the commands. At procedure 540, at the scheduled time for one VM OS, the hypervisor 200 requests the necessary data of the designated VM OS for booting, and stores the data of the designated VM OS in the corresponding VM 222. Thus, the data of the VM OS is ready in the memory 114 of the virtualization server 110 for the user. At procedure 550, the user attempts to login the system 100 at the thin client 170 through the network 160. At procedure 560, the virtualization server 110 merely requests for the user data 145 from the storage server 120. In this case, the virtualization server 110 does not need to retrieve the data of the VM OS from the storage server 120.

As described in the embodiments of the present disclosure, in order to avoid the boot storm problem, the storage server utilizes the VMSS module and the configuration module to control the scheduling and the sequence of the starting or booting of the VM OS instances. Thus, the system does not require high speed SSD, RAM disk drivers or other hardware/software devices to increase the disk I/O speed, and no additional hardware costs is needed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   at least one virtualization server configured to execute a hypervisor;
   at least one remote computing device in communication to the at least one virtualization server via a network; and
   a storage server in communication to the at least one virtualization server, the storage server storing a plurality of virtual machine (VM) operating systems (OS's), wherein the storage server comprises computer executable code, wherein the code, when executed at a processor, is configured to
   determine a scheduled start time for each of the VM OS's based on configuration data corresponding to the VM OS's,
   generate a command based on the scheduled start time for each of the VM OS's, and
   send the command to the at least one virtualization server such that the hypervisor at the at least one virtualization server requests data of one of the VM OS's at the corresponding scheduled start time to start the one of the VM OS's;
   wherein the hypervisor, when executed, is configured to:
   receive the command from the storage server,
   determine the scheduled start time for the one of the VM OS's based on the command,
   at the scheduled start time for the one of the VM OS's, request data of the one of the VM OS's from the storage server, and
   in response to receiving an executing command of a specific one of the VM OS's from the at least one remote computing device via the network, execute the specific one of the VM OS's.

2. The system as claimed in claim 1, wherein the code comprises a VM scheduler service (VMSS) module and a configuration module storing the configuration data corresponding to the VM OS's,
   wherein the VMSS module is configured to
   retrieve the configuration data from the configuration module,
   determine the scheduled start time for each of the VM OS's based on the configuration data,
   generate the command based on the scheduled start time for each of the VM OS's, and
   send the command to the at least one virtualization server.

3. The system as claimed in claim 2, wherein the configuration data includes data of the scheduled start time for each of the VM OS's.

4. The system as claimed in claim 2, wherein the configuration data includes data usable to calculate the scheduled start time for each of the VM OS's.

5. The system as claimed in claim 4, wherein the data usable to calculate the scheduled start time for each of the VM OS's comprises data of a total number of the VM OS's, an order of each VM OS in a sequence of the VM OS's, a starting time length for each of the VM OS's, and a number of the VM OS's to be simultaneously started.

6. The system as claimed in claim 5, wherein the VMSS module is configured to determine the scheduled start time for each of the VM OS's by calculating the scheduled start time based on the total number of the VM OS's, the order of each VM OS in the sequence of the VM OS's, the starting time length for each of the VM OS's and the number of the VM OS's to be simultaneously started.

7. The system as claimed in claim 1, wherein the hypervisor is configured to request data of at least two of the VM OS's from the storage server simultaneously.

8. The system as claimed in claim 1, wherein when the hypervisor receives, from the at least one remote computing device via the network, the executing command of the specific one of the VM OS's prior to the scheduled start time for the specific one of the VM OS's, the hypervisor is further configured to
   based on the executing command, request data of the specific one of the VM OS's from the storage server, and execute the specific one of the VM OS's without waiting until the scheduled start time.

9. A method of controlling sequence and schedules of booting of a plurality of virtual machines (VM), comprising:

determining, at a storage server, a scheduled start time for each of a plurality of VM operating systems (OS's) based on configuration data corresponding to the VM OS's;

generating, at the storage server, a command based on the scheduled start time for each of the VM OS's;

sending, by the storage server, the command to at least one virtualization server such that a hypervisor executed at the at least one virtualization server requests data of one of the VM OS's at the corresponding scheduled start time to start the one of the VM OS's;

receiving, at the hypervisor executed at the at least one virtualization server, the command from the storage server;

determining, at the hypervisor, the scheduled start time for the one of the VM OS's based on the command;

at the scheduled start time for the one of the VM OS's, requesting, by the hypervisor, data of the one of the VM OS's from the storage server; and in response to receiving an executing command of a specific one of the VM OS's from at least one remote computing device via a network, executing, at the hypervisor, the specific one of the VM OS's.

10. The method as claimed in claim 9, wherein the storage server comprises a VM scheduler service (VMSS) module and a configuration module storing the configuration data corresponding to the VM OS's, wherein the VMSS module is configured to
retrieve the configuration data from the configuration module,
determine the scheduled start time for each of the VM OS's based on the configuration data,
generate the command based on the scheduled start time for each of the VM OS's, and
send the command to the at least one virtualization server.

11. The method as claimed in claim 10, wherein the configuration data includes data of the scheduled start time for each of the VM OS's.

12. The method as claimed in claim 10, wherein the configuration data includes data usable to calculate the scheduled start time for each of the VM OS's.

13. The method as claimed in claim 12, wherein the data usable to calculate the scheduled start time for each of the VM OS's comprises data of a total number of the VM OS's, an order of each VM OS in a sequence of the VM OS's, a starting time length for each of the VM OS's, and a number of the VM OS's to be simultaneously started.

14. The method as claimed in claim 13, wherein the VMSS module is configured to determine the scheduled start time for each of the VM OS's by calculating the scheduled start time based on the total number of the VM OS's, the order of each VM OS in the sequence of the VM OS's, the starting time length for each of the VM OS's and the number of the VM OS's to be simultaneously started.

15. The method as claimed in claim 9, further comprising:
in response to receiving, at the hypervisor from the at least one remote computing device via the network, the executing command of the specific one of the VM OS's prior to the scheduled start time for the specific one of the VM OS's, requesting, by the hypervisor, data of the specific one of the VM OS's from the storage server based on the executing command, and executing the specific one of the VM OS's without waiting until the scheduled start time.

16. The method as claimed in claim 9, wherein the hypervisor is configured to request data of at least two of the VM OS's from the storage server simultaneously.

17. A non-transitory computer readable medium storing computer executable code, wherein the code, when executed at a processor, is configured to
determine, at a storage server, a scheduled start time for each of a plurality of virtual machine (VM) operating systems (OS's) based on configuration data corresponding to the VM OS's,
generate, at the storage server, a command based on the scheduled start time for each of the VM OS's,
send, by the storage server, the command to at least one virtualization server such that a hypervisor executed at the at least one virtualization server requests data of one of the VM OS's at the corresponding scheduled start time to start the one of the VM OS's,
wherein the hypervisor executed at the at least one virtualization server is configured to:
receive the command from the storage server,
determine the scheduled start time for the one of the VM OS's based on the command,
at the scheduled start time for the one of the VM OS's, request data of the one of the VM OS's from the storage server, and
in response to receiving an executing command of a specific one of the VM OS's from at least one remote computing device via a network, execute the specific one of the VM OS's.

18. The non-transitory computer readable medium as claimed in claim 17, wherein the code comprises a VM scheduler service (VMSS) module and a configuration module storing the configuration data corresponding to the VM OS's,
wherein the VMSS module is configured to
retrieve the configuration data from the configuration module,
determine the scheduled start time for each of the VM OS's based on the configuration data,
generate the command based on the scheduled start time for each of the VM OS's, and
send the command to the at least one virtualization server.

19. The non-transitory computer readable medium as claimed in claim 18, wherein the configuration data includes data of the scheduled start time for each of the VM OS's.

20. The non-transitory computer readable medium as claimed in claim 18, wherein the configuration data includes data usable to calculate the scheduled start time for each of the VM OS's.

21. The non-transitory computer readable medium as claimed in claim 20, wherein the data usable to calculate the scheduled start time for each of the VM OS's comprises data of a total number of the VM OS's, an order of each VM OS in a sequence of the VM OS's, a starting time length for each of the VM OS's, and a number of the VM OS's to be simultaneously started.

22. The non-transitory computer readable medium as claimed in claim 21, wherein the VMSS module is configured to determine the scheduled start time for each of the VM OS's by calculating the scheduled start time based on the total number of the VM OS's, the order of each VM OS in the sequence of the VM OS's, the starting time length for each of the VM OS's and the number of the VM OS's to be simultaneously started.

23. The non-transitory computer readable medium as claimed in claim 17, wherein the hypervisor executed at the at least one virtualization server is further configured to in response to receiving, from the at least one remote computing device via the network, the executing command of the specific one of the VM OS's prior to the scheduled start time for the specific one of the VM OS's, request data of the specific one of the VM OS's from the storage server based on the executing command, and execute the specific one of the VM OS's without waiting until the scheduled start time.

24. The non-transitory computer readable medium as claimed in claim 17, wherein the hypervisor is configured to request data of at least two of the VM OS's from the storage server simultaneously.

\* \* \* \* \*